US012694545B2

(12) United States Patent
Chen et al.

(10) Patent No.: US 12,694,545 B2
(45) Date of Patent: Jul. 28, 2026

(54) ENCODING IRREGULAR SHAPES USING ANGLE-BASED CONTOUR DESCRIPTORS

(71) Applicant: Microsoft Technology Licensing, LLC, Redmond, WA (US)

(72) Inventors: Tianyi Chen, Kenmore, WA (US); Tianyu Ding, Kirkland, WA (US); Luming Liang, Redmond, WA (US); Ilya Dmitriyevich Zharkov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 18/339,211

(22) Filed: Jun. 21, 2023

(65) Prior Publication Data

US 2024/0428431 A1 Dec. 26, 2024

(51) Int. Cl.
| | |
|---|---|
| *G06K 9/00* | (2022.01) |
| *G06T 7/13* | (2017.01) |
| *G06T 7/50* | (2017.01) |
| *G06T 7/60* | (2017.01) |

(52) U.S. Cl.
CPC ................. G06T 7/50 (2017.01); G06T 7/13 (2017.01); G06T 7/60 (2013.01); *G06T 2207/20021* (2013.01); *G06T 2207/20081* (2013.01); *G06T 2207/20084* (2013.01)

(58) Field of Classification Search
CPC .... G06T 7/50; G06T 7/13; G06T 7/60; G06T 2207/20021; G06T 2207/20081; G06T 2207/20084; G06T 2207/30196; G06T 2207/30221
See application file for complete search history.

(56) References Cited

U.S. PATENT DOCUMENTS

| | | | |
|---|---|---|---|
| 10,062,187 B1 * | 8/2018 | Cai | G06T 11/23 |
| 2007/0127816 A1 * | 6/2007 | Balslev | G06T 7/12 |
| | | | 382/181 |
| 2015/0261803 A1 * | 9/2015 | Song | G06F 16/2246 |
| | | | 382/199 |

(Continued)

FOREIGN PATENT DOCUMENTS

WO WO-2023277974 A1 * 1/2023 .............. G06T 7/60

OTHER PUBLICATIONS

Bezier curve-based generic shape encoder, F.A. Sohel et al., IETDL, 2010, pp. 92-102 (Year: 2010).*

(Continued)

*Primary Examiner* — Jayesh A Patel
(74) *Attorney, Agent, or Firm* — Seed Intellectual Property Law Group LLP

(57) ABSTRACT

A method performed by a processor of a computing system is described herein, where the method includes obtaining an image that includes an object having a shape, where a boundary of the shape of the object in the digital image is labeled in the digital image. The method also includes computing an encoding for the shape, where computing the encoding for the shape includes partitioning the shape into multiple partitions. Computing the encoding for the shape further includes, for the multiple partitions, computing angle-based contour descriptors that represent boundaries of the partitions, where the encoding for the shape of the object is based upon the angle-based contour descriptors.

18 Claims, 9 Drawing Sheets

(56) References Cited

U.S. PATENT DOCUMENTS

| | | | | |
|---|---|---|---|---|
| 2016/0162758 A1* | 6/2016 | Prest | | G06T 7/73 |
| | | | | 382/159 |
| 2019/0318502 A1* | 10/2019 | He | | G06T 7/337 |
| 2021/0375008 A1* | 12/2021 | Hassan | | G06N 3/09 |
| 2022/0180663 A1* | 6/2022 | Lazarou | | G06V 40/28 |
| 2022/0245394 A1* | 8/2022 | Virodov | | G06V 20/00 |
| 2023/0005217 A1* | 1/2023 | Chen | | G06N 20/00 |

OTHER PUBLICATIONS

Shape description using cubic polynomial Bezier curves, L. Cinque et al., Elsevier, 1998, pp. 821-828 (Year: 1998).*

Evaluating contour segment descriptors, Cong Yang et al., Springer, 2017, pp. 373-391 (Year: 2017).*

A Robust Snake Implementation a Dual Active Contour, Steve R. Gunn et al., IEEE, 1997, pp. 63-68 (Year: 1997).*

Integral Contour Angle: An Invariant Shape Descriptor for Classification and Retrieval of Leaf Images, Feng Ni, Bin Wang, IEEE, 2018, pp. 1223-1227 (Year: 2018).*

Alajlan, et al., "Shape Retrieval Using triangle-Area Representation and Dynamic Space Warping", In Journal of Pattern Recognition, vol. 40, Jul. 1, 2007, pp. 1911-1920.

Arbelaez, et al., "Contour Detection and Hierarchical Image Segmentation", In Journal of IEEE Transactions on Pattern Analysis and Machine Intelligence, Aug. 26, 2010, pp. 898-916.

Bai, et al., "Integrating Contour and Skeleton for Shape Classification", In Proceedings of IEEE 12th International Conference on Computer Vision Workshops, ICCV Workshops, Sep. 27, 2009, pp. 360-367.

Belongie, et al., "Shape Matching and Object Recognition Using Shape Contexts", In Journal of IEEE transactions on pattern analysis and machine intelligence, vol. 24, Issue 4, Apr. 1, 2002, pp. 509-522.

Bertasius, et al., "DeepEdge: A Multi-Scale Bifurcated Deep Network for Top-Down Contour Detection", In Proceedings of the IEEE Conference on Computer Vision and Pattern Recognition, Jun. 7, 2015, pp. 4380-4389.

Boley, et al., "Principal Direction Divisive Partitioning", In Journal of Data mining and knowledge discovery, vol. 2, Dec. 1, 1998, pp. 325-344.

Bolya, et al., "Yolact: Real-Time Instance Segmentation", In Proceedings of the IEEE/CVF International Conference on Computer Vision, Oct. 27, 2019, pp. 9157-9166.

Chen, et al., "BlendMask: Top-Down Meets Bottom-Up for Instance Segmentation", In Proceedings of the IEEE/CVF Conference on Computer Vision and Pattern Recognition, Jun. 13, 2020, pp. 8573-8581.

Chen, et al., "DCAN: Deep Contour-Aware Networks for Object Instance Segmentation From Histology Images", In Journal of Medical image analysis, vol. 36, Feb. 1, 2017, pp. 135-146.

Chuang, et al., "Wavelet Descriptor of Planar Curves: Theory and Applications", In Journal of IEEE Transactions on Image Processing, vol. 5, Jan. 1, 1996, pp. 56-70.

Cinque, et al., "Shape Description Using Cubic Polynomial Bezier Curves", In Journal of Pattern Recognition Letters, vol. 19, Issue 9, Jul. 1, 1998, pp. 821-828.

Cohen, Laurentd. , "On Active Contour Models and Balloons", In Journal of CVGIP: Image understanding, vol. 53, Issue 2, Mar. 1, 1991, pp. 211-218.

Cootes, et al., "Active Shape Models—Their Training and Application", In Journal of Computer Vision and Image Understanding, Jan. 1, 1995, pp. 38-59.

Desimone, et al., "Contour, Color and Shape Analysis Beyond the Striate Cortex", In Journal of Vision research, vol. 25, Issue 3, Jan. 1, 1985, pp. 441-452.

Ding, et al., "Dual Principal Component Pursuit for Robust Subspace Learning: Theory and Algorithms for a Holistic Approach", In Proceedings of International Conference on Machine Learning, Jul. 18, 2021, 10 Pages.

Dudek, et al., "Shape Representation and Recognition from Multiscale Curvature", In Journal of Computer Vision and Image Understanding, vol. 68, Issue 2, Nov. 1, 1997, pp. 170-189.

Elder, Jamesh. , "Shape from Contour: Computation and Representation", In Journal of Annual review of vision science, vol. 4, Sep. 15, 2018, pp. 423-450.

Everingham, et al., "The Pascal Visual Object Classes (VOC) Challenge", In Journal of International journal of computer vision, vol. 88, Jun. 2010, pp. 303-338.

Garcia, et al., "A Review on Deep Learning Techniques Applied to Semantic Segmentation", In repository of arXiv:1704.06857v1, Apr. 22, 2017, 23 Pages.

Geiger, et al., "Are We Ready for Autonomous Driving? The KITTI Vision Benchmark Suite", In Proceedings of IEEE conference on computer vision and pattern recognition, Jun. 16, 2012, pp. 3354-3361.

Gidaris, et al., "Object Detection via a Multi-Region and Semantic Segmentation-Aware CNN Model", In Proceedings of the IEEE International Conference on Computer Vision, Dec. 7, 2015, pp. 1134-1142.

Girshick, Ross, "Fast R-CNN", In Proceedings of the IEEE International Conference on Computer Vision, Dec. 7, 2015, pp. 1440-1448.

Gong, et al., "An Overview of Contour Detection Approaches", In Journal of International Journal of Automation and Computing, vol. 15, Issue 6, Jun. 29, 2018, pp. 656-672.

Gunn, et al., "A Robust Snake Implementation; A Dual Active Contour", In Journal of IEEE Transactions on pattern analysis and machine intelligence, vol. 19, Issue 1, Jan. 1, 1997, pp. 63-68.

Hariharan, et al., "Semantic Contours from Inverse Detectors", In Proceedings of International Conference on Computer Vision, Nov. 6, 2011, pp. 991-998.

He, et al., "Mask R-CNN", In Proceedings of the IEEE International Conference on Computer Vision, Oct. 29, 2017, pp. 2961-2969.

Kaick, et al., "A Survey on Shape Correspondence", In Journal of Computer Graphics Forum, vol. 30, Issue 6, Jul. 11, 2011, pp. 1681-1707.

Kass, et al., "Snakes: Active Contour Models", In Journal of International journal of computer vision, vol. 1, Issue 4, Jan. 1, 1998, pp. 321-331.

Koenderink, et al., "What Does the Occluding Contour Tell Us About Solid Shape?", In Journal of Perception, vol. 13, Issue 3, Jan. 1, 1984, pp. 321-330.

Lee, et al., "CenterMask: Real-Time Anchor-Free Instance Segmentation", In Proceedings of the IEEE/CVF Conference on Computer Vision and Pattern Recognition, Jun. 13, 2020, pp. 13906-13915.

Lerman, et al., "An Overview of Robust Subspace Recovery", In Proceedings of the IEEE, vol. 106, Issue 8, Aug. 6, 2018, pp. 1380-1410.

Lerman, et al., "Fast, Robust and Non-Convex Subspace Recovery", In Journal of Information and Inference: A Journal of the IMA, vol. 7, Issue 2, Dec. 21, 2017, pp. 277-336.

Liang, et al., "PolyTransform: Deep Polygon Transformer for Instance Segmentation", In Proceedings of the IEEE/CVF Conference on Computer Vision and Pattern Recognition, Jun. 13, 2020, pp. 9131-9140.

Lin, et al., "Microsoft COCO: Common Objects in Context", In Proceedings of 13th European Conference Computer Vision, Sep. 6, 2014, 16 Pages.

Ling, et al., "Fast Interactive Object Annotation With Curve-GCN", In Proceedings of the IEEE/CVF Conference on Computer Vision and Pattern Recognition, Jun. 16, 2019, pp. 5257-5266.

Liu, et al., "Dance: A Deep Attentive Contour Model for Efficient Instance Segmentation", In Proceedings of the IEEE/CVF Winter Conference on Applications of Computer Vision, Jan. 3, 2021, pp. 345-354.

Lopes, Miles, "Estimating Unknown Sparsity in Compressed Sensing", In Proceedings of the 30th International Conference on Machine Learning, May 26, 2013, 9 Pages.

Maurer, et al., "A linear time algorithm for computing exact Euclidean distance transforms of binary images in arbitrary dimensions", In Journal of IEEE Transactions on Pattern Analysis and Machine Intelligence, vol. 25, Issue 2, Feb. 19, 2003, pp. 265-270.

(56)                    References Cited

OTHER PUBLICATIONS

Minaee, et al., "Image Segmentation Using Deep Learning: A Survey", In Journal of IEEE Transactions on Pattern Analysis and Machine Intelligence, vol. 44, Issue 7, Feb. 17, 2021, pp. 3523-3542.

Mokhtarian, et al., "A Theory of Multiscale, Curvature-Based Shape Representation for Planar Curves", In Journal of IEEE Transactions on Pattern Analysis and Machine Intelligence, vol. 14, Issue 8, Aug. 1, 1992, pp. 789-805.

Otterloo, Peterj. , "A Contour-Oriented Approach to Shape Analysis", Published by Peter J Van Otterloo, Jan. 1, 1991, 393 Pages.

Park, et al., "Eigencontours: Novel Contour Descriptors Based on Low-Rank Approximation", In Proceedings of the IEEE/CVF Conference on Computer Vision and Pattern Recognition, Jun. 18, 2022, pp. 2667-2675.

Pedronette, et al., "Shape Retrieval Using Contour Features and Distance Optimization", In Proceedings of VISAPP, May 1, 2010, 6 Pages.

Peng, et al., "Deep Snake for Real-Time Instance Segmentation", In Proceedings of the IEEE/CVF Conference on Computer Vision and Pattern Recognition, Jun. 13, 2020, pp. 8533-8542.

Qi, et al., "Amodal Instance Segmentation With KINS Dataset", In Proceedings of the IEEE/CVF Conference on Computer Vision and Pattern Recognition, Jun. 16, 2019, pp. 3014-3023.

Redmon, et al., "YOLOv3: An Incremental Improvement", In repository of arXiv:1804.02767v1, Apr. 8, 2018, 6 Pages.

Ren, et al., "Faster R-CNN: Towards Real-Time Object Detection with Region Proposal Networks", In Journal of Advances in neural information processing systems, vol. 28, Dec. 7, 2015, 9 Pages.

Shen, et al., "DeepContour: A Deep Convolutional Feature Learned by Positive-Sharing Loss for Contour Detection", In Proceedings of the IEEE Conference on Computer Vision and Pattern Recognition, Jun. 7, 2015, pp. 3982-3991.

Shotton, et al., "Contour-Based Learning for Object Detection", In Proceedings of IEEE International Conference on Computer Vision, Oct. 17, 2005, pp. 503-510.

Tian, et al., "FCOS: Fully Convolutional One-Stage Object Detection", In Proceedings of the IEEE/CVF International Conference on Computer Vision, Oct. 27, 2019, pp. 9627-9636.

Zhang, et al., "A Comparative Study on Shape Retrieval Using Fourier Descriptors with Different Shape Signatures", In Proceedings of International Conference on Intelligent Multimedia and Distance Education, Jun. 1, 2001, 9 Pages.

Tsakiris, et al., "Dual Principal Component Pursuit", In Proceedings of the IEEE International Conference on Computer Vision, Dec. 7, 2015, pp. 10-18.

Veltkamp, et al., "State of the Art in Shape Matching", In Proceedings of Principles of Visual Information Retrieval, Jan. 1, 2001, 38 Pages.

Wang, et al., "Linear Subspace Design for Real-Time Shape Deformation", In Journal of ACM Transactions on Graphics, vol. 34, Issue 4, Jul. 27, 2015, pp. 1-11.

Weng, et al., "2D Shape Deformation Using Nonlinear Least Squares Optimization", In Journal of the visual computer, vol. 22, Aug. 24, 2006, pp. 653-660.

Xie, et al., "PolarMask: Single Shot Instance Segmentation With Polar Representation", In Proceedings of the IEEE/CVF Conference on Computer Vision and Pattern Recognition, Jun. 13, 2020, pp. 12193-12202.

Xu, et al., "Explicit Shape Encoding for Real-Time Instance Segmentation", In Proceedings of the IEEE/CVF International Conference on Computer Vision, Oct. 27, 2019, pp. 5168-5177.

Yang, et al., "Dense RepPoints: Representing Visual Objects with Dense Point Sets", In Proceedings of 16th European Conference Computer Vision, Aug. 23, 2020, pp. 227-244.

Yang, et al., "Object Contour Detection With a Fully Convolutional Encoder-Decoder Network", In Proceedings of the IEEE Conference on Computer Vision and Pattern Recognition, Jun. 27, 2016, pp. 193-202.

Zdilla, et al., "Circularity, Solidity, Axes of a Best Fit Ellipse, Aspect Ratio, and Roundness of the Foramen Ovale: A Morphometric Analysis With Neurosurgical Considerations", In Journal of the Journal of craniofacial surgery, vol. 27, Issue 1, Jan. 1, 2016, 18 Pages.

Zhou, et al., "CIA-Net: Robust Nuclei Instance Segmentation with Contour-Aware Information Aggregation", In Proceedings of 6th International Conference information Processing in Medical Imaging, Jun. 2, 2019, pp. 682-693.

Perez, et al.,"Optimum Polygonal Approximation of Digitized Curves", In Journal of Pattern Recognition Letters, vol. 15, Issue 8 , Aug. 1, 1994, pp. 743-750.

* cited by examiner

504

502

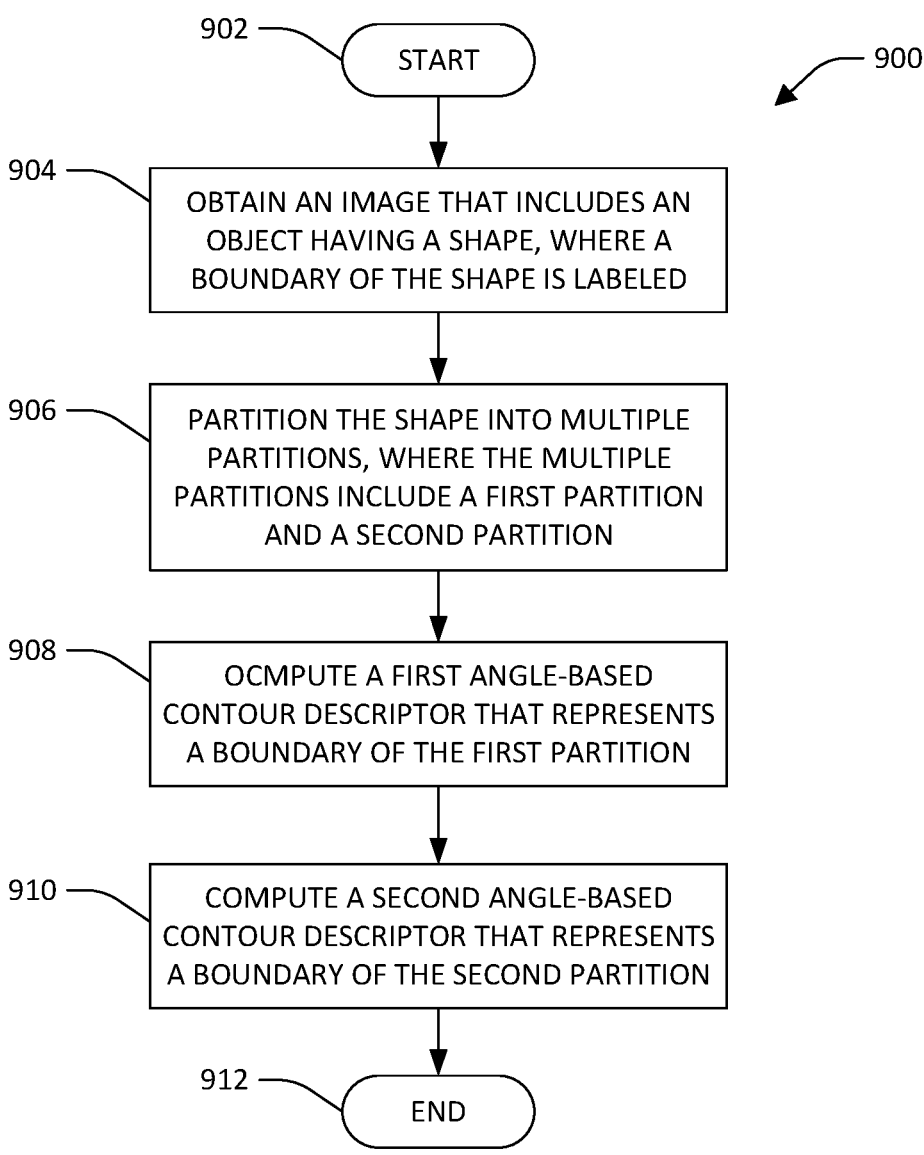

902 — START

900

904 — OBTAIN AN IMAGE THAT INCLUDES AN OBJECT HAVING A SHAPE, WHERE A BOUNDARY OF THE SHAPE IS LABELED

906 — PARTITION THE SHAPE INTO MULTIPLE PARTITIONS, WHERE THE MULTIPLE PARTITIONS INCLUDE A FIRST PARTITION AND A SECOND PARTITION

908 — OCMPUTE A FIRST ANGLE-BASED CONTOUR DESCRIPTOR THAT REPRESENTS A BOUNDARY OF THE FIRST PARTITION

910 — COMPUTE A SECOND ANGLE-BASED CONTOUR DESCRIPTOR THAT REPRESENTS A BOUNDARY OF THE SECOND PARTITION

912 — END

FIG. 9

1102 — START

1100

1104 — CONCATENATE DISTANCE VECTORS OF CONTOUR DESCRIPTORS TO FORM CONTOUR MATRIX

1106 — ESTIMATE SUBSPACE OF THE CONTOUR MATRIX BY COMPUTING M-DIMENSIONAL BASIS

1108 — COMPUTE COEFFICIENT MATRIX, WHERE THE COEFFICIENT MATRIX IS USABLE WITH THE BASIS TO APPROXIMATE THE DISTANCE VECTORS

1110 — END

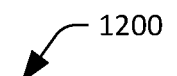
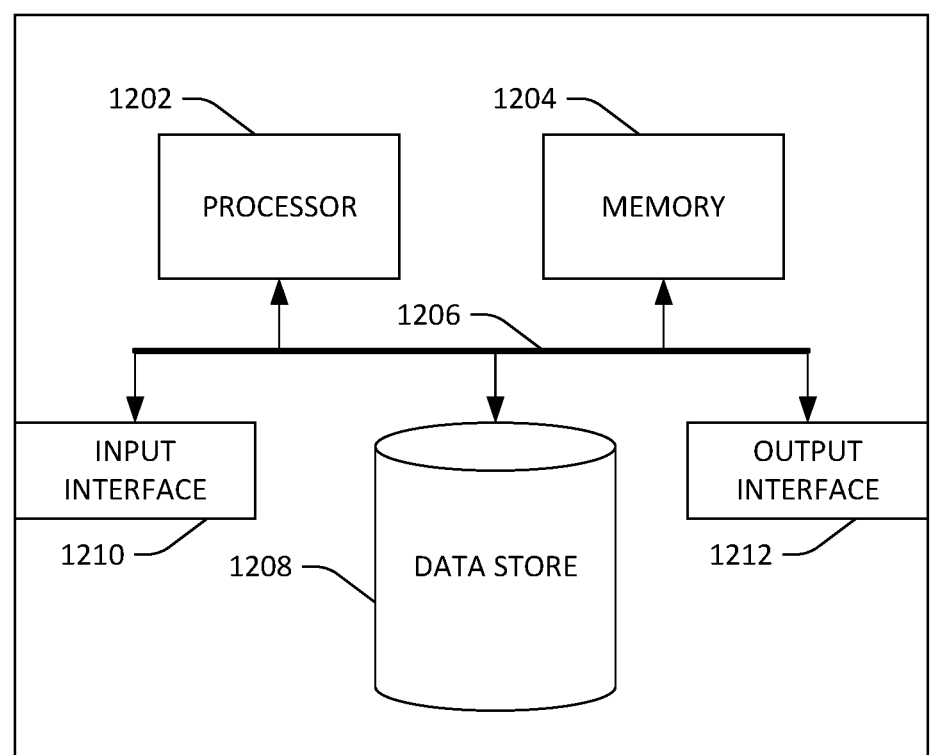
FIG. 12

ENCODING IRREGULAR SHAPES USING ANGLE-BASED CONTOUR DESCRIPTORS

BACKGROUND

In computer graphics and computer-implemented vision applications, contour descriptors have been employed to describe shapes of objects that are captured in images. Example computer-implemented applications include, but are not limited to, shape retrieval and image segmentation. In such applications, contour descriptors are used to represent boundaries of objects. An advantage of a contour descriptor over other technologies employed to represent boundaries of objects is that contour descriptors tend to be relatively compact (consume a relatively small amount of computer-readable memory when stored). In an example, an angle-based contour descriptor can represent a boundary of an object having a regular shape (e.g., a shape having little to no concavity) using a value that identifies an inner center of the object and radii (distance) values from the inner center, where the distance values are sampled at predefined angles from a reference direction. Since the angles are inherently directional, the angle-based contour descriptor includes a 1-dimensional sequence of radii and the value that identifies the inner center of the object. Angle-based contour descriptors, however, are limited to representing substantially regular (e.g., (star) convex) shapes; use of an angle-based contour descriptor to represent an irregular shape results in errors when the shape is reconstructed through use of the angle-based contour descriptor.

Contrary to an angle-based contour descriptor, a vertex-based contour descriptor represents a boundary of a shape through utilization of a collection of polygon vertex coordinates (in the Cartesian coordinate system) along the boundary of the shape. Vertex-based contour descriptors, however, are more sensitive to noise when compared to angle-based contour descriptors, due to 2-dimensional sampling sequences in the X and Y axes employed to construct vertex-based contour descriptors. Therefore, a vertex-based contour descriptor can be employed to fit nearly any shape (including highly irregular shapes). Problems associated with correspondence interlacing arise when attempting to train a learning-based algorithm (such as an algorithm for performing image segmentation) using vertex-based contour descriptors, making learning difficult and reducing effectiveness of the learning-based algorithm. Angle-based contour descriptors are not associated with correspondence interlacing. As referenced above, however, usefulness of conventional angle-based contour descriptors to represent shape boundaries is limited, as conventional angle-based contour descriptors are unable to represent boundaries of irregular shapes.

SUMMARY

The following is a brief summary of subject matter that is described in greater detail herein. This summary is not intended to be limiting as to the scope of the claims.

Described herein are various technologies pertaining to constructing a contour descriptor that represents a boundary of an object in an image, where the contour descriptor includes several angle-based contour descriptors, and further where the technologies are well-suited to encode the boundary of the object regardless of shape of the object (i.e., the contour descriptor can represent a boundary of a highly irregular shape). In contrast to a conventional contour descriptor, which represents a single global contour and is unable to accurately represent a non-(star)convex shape, the contour-descriptor described herein is based upon multiple local angle-based contour descriptors for contours of a shape that are adaptively generated, such that complex shapes can be encoded by the contour-descriptor. With more particularity, a hierarchical encoding procedure is described herein, where such procedure recursively subdivides the shape of an object into partitions until the resultant partitions are sufficiently regular or a threshold depth is achieved (where depth refers to a number of parent partitions of a partition). Local angle-based contour descriptors are then computed for the identified partitions. Hence, local angle-based contour descriptors are generated at a greater density at regions of the shape where the shape boundary exhibits rapidly varying curvatures compared to regions of the shape that have less variance in curvature, as the hierarchical subdivision of the shape increases examination frequency around along irregularly-shaped boundary regions.

In more detail, given a training set of images that includes an image that comprises an object having a shape (defined by a labeled boundary), the shape is hierarchically subdivided into partitions, and the partitions are encoded using local angle-based contour descriptors. An angle-based contour descriptor, as described above, includes a value that identifies an inner center of the partition and a one-dimensional vector of distance values (radii values) that define distances of the shape boundary from the inner center at a set of predefined angles. Accordingly, the shape can be encoded as a plurality of local angle-based contour descriptors.

Thereafter, a contour matrix is constructed by stacking together the one-dimensional vectors of radii (distance vectors) of the local angle-based contour descriptors. Based upon values of the contour matrix, a low-rank robust subspace $S$ is computed, where $S$ approximates the contour matrix. More specifically, an M-dimensional basis is computed, where $M$ is a selectable parameter. A distance vector can be approximated by a vector of coefficients that, when multiplied with the basis, results in an approximation of the distance vector. That is, a distance vector of a local angle-based contour descriptor is recoverable by linearly combining the $M$ most dominant basis vectors. The same set of $M$ basis vectors is shared for approximating and reconstructing multiple local contour descriptors, and accordingly approximations of distance vectors consume a relatively small amount of memory.

The approaches described herein can be incorporated into various computer graphics and vision applications, such as shape retrieval and image segmentation. The contour descriptor is well-suited for use in machine learning approaches, due to such descriptor being based upon multiple angle-based contour descriptors, which do not exhibit the issues with machine learning associated with vertex-based contour descriptors. Moreover, the contour descriptor described herein is able to accurately represent nearly any shape, including highly irregular shapes.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 7 depicts a second partition after a disconnected component has been removed from the second partition

FIG. 9 is a flow diagram that illustrates a method for encoding a boundary of an object using multiple local angle-based contour descriptors.

FIG. 12 illustrates a computing system.

DETAILED DESCRIPTION

Figure 1:
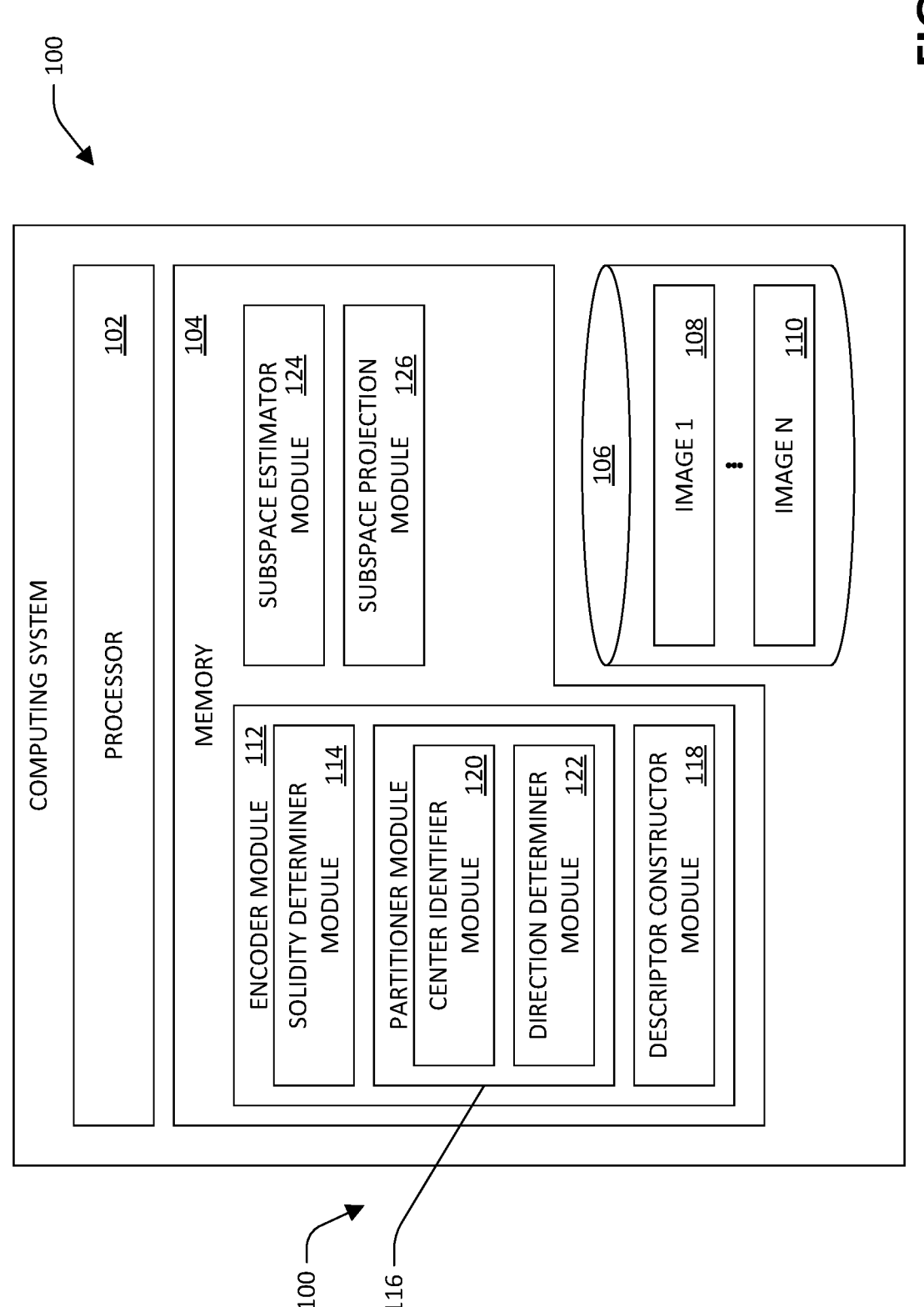
FIG. 1 is a functional block diagram of a computing system that is configured to encode a shape of an object in an image through utilization of multiple angle-based contour descriptors.

Various technologies pertaining to encoding a boundary of an object in an image using angle-based contour descriptors are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Described herein are various technologies pertaining to encoding a shape of an object in an image by hierarchically subdividing the shape into multiple partitions and constructing angle-based contour descriptor for the resultant partitions. With more specificity, an image in a training set of images is obtained, where the image includes an object, and further where a boundary of the object is labeled in the image. A computing system utilizes a hierarchical subdivision approach to partition a shape defined by the boundary into multiple partitions, such that partitions of increasingly regular shape are obtained. The subdivision process continues until: 1) each partition has a shape that is sufficiently regular; or 2) a threshold depth is achieved (e.g., a partition has a threshold number of parent partitions). Subsequent to the shape being subdivided into the multiple partitions, the computing system constructs angle-based contour descriptors for the partitions, such that the shape is encoded using several angle-based contour descriptors. Such process can be repeated for numerous objects in several images in the training set, such that encodings for boundaries of the objects are formed (where each encoding includes at least one angle-based contour descriptor).

The computing system can further construct approximations for the encodings, where such approximations can be used to recover the encoded boundaries (and thus shapes defined by the boundaries). More specifically, a local angle-based contour descriptor for a partition includes a value that identifies a location of an inner center of the partition and a distance vector, where the distance vector includes distance values at predefined angles from a reference direction (e.g., 360 distance vectors, one for each degree). The computing system forms a contour matrix by "stacking" the distance vectors of the local angle-based descriptors (that encode multiple different object boundaries). The computing system then estimates a subspace of the contour matrix through computation of an M-dimensional basis of the subspace, where M is a selectable parameter. A distance vector of an angle-based contour descriptor can be represented by a coefficient matrix, where application of the coefficient matrix to the M-dimensional basis results in an approximation of the distance vector. Since the basis represents the subspace for multiple distance vectors of multiple angle-based encodings of multiple object boundaries, only the basis and the coefficient matrix need to be stored to allow for approximation of the distance vectors and thus for the reconstruction of the angle-based contour descriptors that encode boundaries of the objects. The technologies described herein exhibits numerous advantages over conventional technologies for encoding boundaries of objects (and thus shapes) in images through use of angle-based contour descriptors, as the technologies described herein allow for angle-based contour descriptors to encode irregular shapes. Moreover, through use of the subspace estimation and projection technologies referenced above, a relatively small amount of computer-readable storage is consumed when storing approximations of the contour descriptors, which is an improvement over vertex-based contour descriptors. Still further, the technologies described herein are applicable to various machine learning applications, such as image segmentation and shape retrieval, amongst others.

With reference now to FIG. 1, a computing system 100 that encodes boundaries of objects in images (and thus boundaries of shapes of the objects) through utilization of angle-based contour descriptors, where the shapes may be irregular, is illustrated. In addition, as will be described in greater detail below, the computing system 100 constructs approximations of the encodings of the shapes of the objects through subspace estimation and subspace projection.

The computing system 100 includes a processor 102 and memory 104 that includes instructions that are executed by the processor 102. The computing system 100 further includes a data store 106. The data store 106 includes a training set, where the training set includes images 108-110. The images 108-110 include objects, where boundaries of the objects are labeled in the images 108-110. Therefore, the first image 108 includes an object, where an exterior boundary of the object is labeled in the first image 108, such that shape of the object is defined. Further, an image in the images 108-110 may include several objects, where boundaries of the several objects are labeled in the image.

The memory 104 includes an encoder module 112 that constructs encodings of the boundaries of the objects in the images 108-110, and thus constructs encodings of shapes of the objects in the images 108-110. As will be described in greater detail herein, the encoder module 112 adaptively and hierarchically subdivides a shape of an object in an image into several partitions and computes angle-based contour descriptors for the several partitions. Accordingly, an encoding for a boundary of an object in an image can include several angle-based contour descriptors (instead of a single contour descriptor, as is employed in conventional technologies to encode object boundaries). The encoder module 112 can relatively accurately encode irregular shapes, such as a shape that includes concave portions.

The encoder module 112 includes a solidity determiner module 114, a partitioner module 116, and a descriptor constructor module 118. The solidity determiner module 114 computes a value of solidity for a shape, where the solidity for the shape is a ratio of an area of a convex hull of the shape to an area of the shape itself. The value of solidity is indicative of regularity of the shape; that is, the higher the value of solidity, the more convex the shape. Conversely, the lower the value of solidity, the more concave the shape.

The partitioner module 116 partitions a shape into several partitions when the value of solidity for the shape computed by the solidity determiner module 114 corresponds to a partition condition (e.g., the value of solidity for the shape is beneath a threshold). As will be described below, the partitioner module 116 can hierarchically subdivide a shape into increasingly regular shapes until either: 1) the solidity of a sub-shape indicates that the sub-shape is sufficiently regular; or 2) a depth reaches a threshold (i.e., until a sub-shape has a predefined number of parent shapes).

The partitioner module 116 includes a center identifier module 120 and a direction determiner module 122. When the partitioner module 116 identifies that a shape is to be partitioned (due to the solidity of the shape corresponding to a partition condition and the depth not reaching the threshold depth), the center identifier module 120 identifies a mass center of the shape. The direction determiner module 122, based upon the mass center of the shape identified by the center identifier module 120, computes a partition line that passes through the mass center of the shape. With more specificity, the direction determiner module 122 computes a first principal direction of the shape based upon a boundary of the shape and identifies the partition line as being a line that is orthogonal to the first principal direction (i.e., the second principal direction of the shape). The partitioner module 116 then partitions the shape along the partition line, thereby subdividing the shape into two partitions (sub-shapes).

As will be described below, in some cases the partitioner module 116 can partition a shape such that one or more of the partitions includes separate, disconnected components. In such a scenario, the partitioner module 116 can identify the disconnected component with the largest area and remove the smaller disconnected components from the first partition. The partitioner module 116 then adds the smaller disconnected components to a second partition. Similarly, when the second partition includes disconnected components, the partitioner module identifies the disconnected component with the largest area, and such component is retained in the second partition. The disconnected components with smaller areas are removed from the second partition and added to the first partition. This process ensures that partitions output by the partitioner module 116 are fully connected (e.g., the partitions output by the partitioner module 116 do not include multiple disconnected components).

As noted above, a shape defined by a boundary of an object in an image can be subdivided into multiple partitions in a hierarchical manner. The descriptor generator module 118 can compute angle-based contour descriptors for the partitions. An angle-based contour descriptor for a partition includes a value that identifies an inner center of the partition and a distance vector. The distance vector includes distance values (radii values) from the inner center of the partition to the boundary of the partition at predefined angles from a reference direction. In an example, the distance vector includes 360 distance values (one distance value per degree). In another example, the distance vector includes 180 distance values (one distance value per two degrees). In yet another example, the distance vector includes 60 distance values (one distance value per 6 degrees). In still yet another example, the distance vector includes 20 distance values (one distance value per 18 degrees). Therefore, for a shape that has been subdivided into five partitions, the descriptor generator module 118 computes five different angle-based contour descriptors (one for each partition). The encoder module 112 outputs an encoding for the boundary of the shape in the image, where the encoding comprises the angle-based contour descriptors computed for the shape by the descriptor generator module 118.

Figure 3:
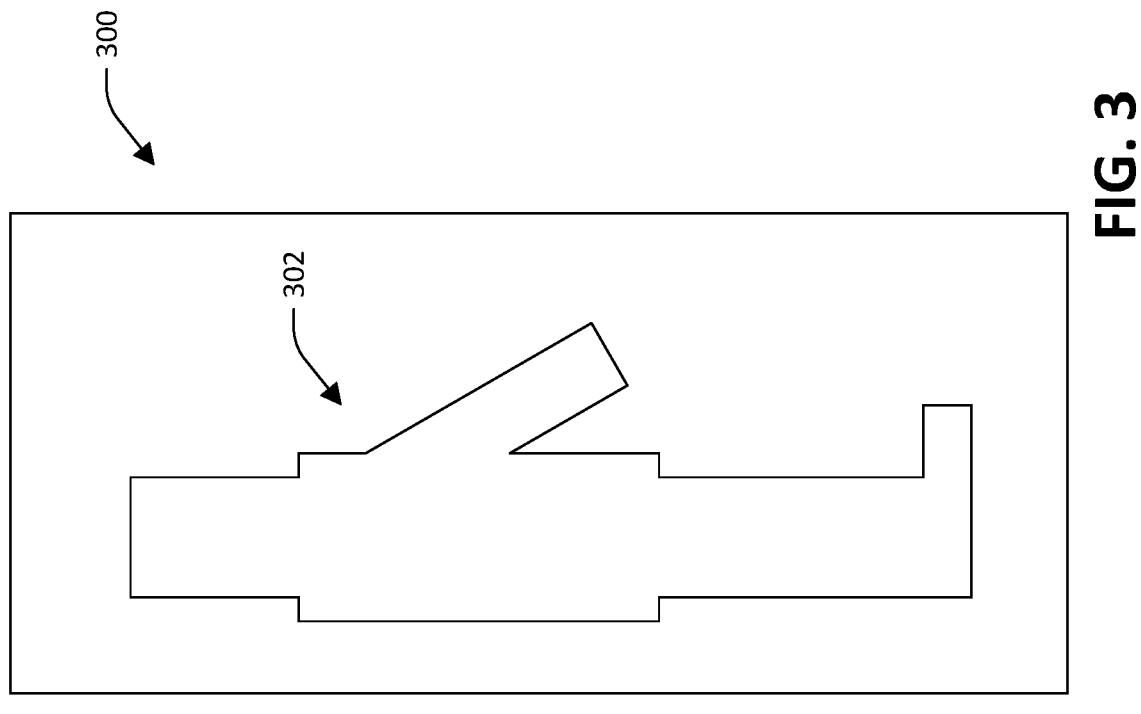
FIG. 3 illustrates a boundary of the object depicted in the image of FIG. 2.
Figure 2:
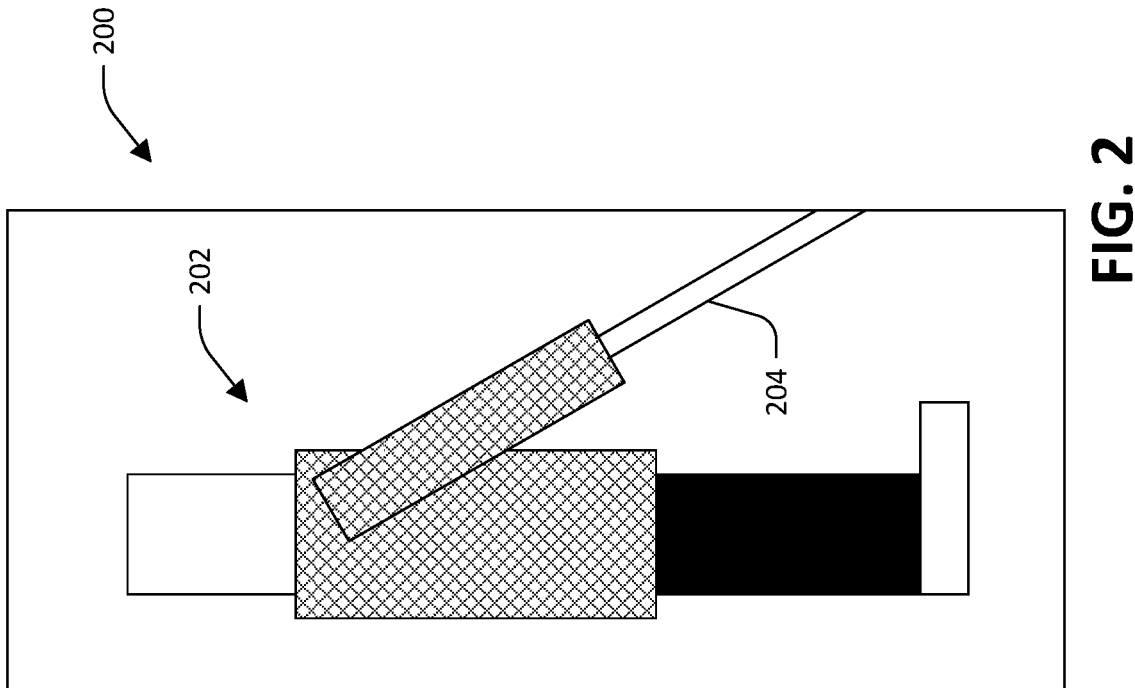
FIG. 2 depicts an image that includes an object.

Operation of the encoder module 112 is now set forth with reference to FIGS. 1-8. The encoder module 112, generally, receives an input shape $\mathcal{M}$ defined by a labeled boundary of an object in an image and computes a subdivision $q=\{s_1, \ldots, s_K\}$ such that each $s_i$ is sufficiently regular and can be efficiently represented by a relatively simple local angle-based contour descriptor. More specifically, the encoder module 112 obtains an image included in the training set from the data store 106. For example, the encoder module 112 obtains the first image 108 from the data store 106. FIG. 2 depicts an example of the first image 108, where the first image 108 includes a person 200 holding a golf club 202. In the first image 108, a boundary of the person 200 is labeled (such that the shape of the person 200 is defined and the shape of the person 200 is distinguished from other objects in the image, such as the golf club 202, and is distinguished from background features of the image). FIG. 3 illustrates an image 300 that depicts a boundary 302 of the person 200 captured in the first image 108.

Upon obtaining the boundary 302, the solidity determiner module 114 computes a solidity of a shape defined by the boundary 302 in connection with estimating regularity of the shape. The solidity of the shape is a ratio of the area of the shape to the area of the convex hull of the shape. The solidity of any shape is between zero and one; the solidity of an entirely convex shape is one, and the more concavity of a shape, the less solidity of the shape. The encoder module 112 deems a shape to be sufficiently regular when, for example, the solidity of the shape exceeds a threshold t. The encoder module 112 is configured to identify a subdivision of the shape defined by the boundary 302, where the subdivision maximizes the total solidities of partitions by solving the following equation:

$$\max_{q,K} \sum_{i=1}^{K} Sld(s_i) \text{ s.t. } k \leq \overline{K}, Sld(s_i) \geq \tau, \forall i, \text{ and} \tag{1}$$

$$\bigcup \{s_i\} = \mathcal{M}$$

where $\overline{K}$ represents the maximum number of subdivisions.

As finding a direct solution to the constrained optimization problem (Eq. 1) is challenging, the encoder module 112 employs a hierarchical encoding procedure in connection with solving Eq. 1 in a greedy manner. Given an object shape in the form of a binary mask $\mathcal{M} \in \{0,1\}^{W \times H}$, the encoder module 112 identifies a set of local contours, or equivalently, a set of centers $\mathcal{C}$ and a set of radii $\mathcal{R}$ that can represent the object shape faithfully, where $$C = \{c_i : c_i \in \mathbb{R}^2\}_{i=1}^{K}, \mathcal{R} = \{r_i : r_i \in \mathbb{R}^N\}_{i=1}^{K},$$

K is the number of local contours, and N is the dimension of the distance vector. In an example, the 360 degree area around a center is uniformly quantized with an angle interval of $\Delta\theta = 1°$, and therefore N=360. Has noted previously, however, N can be any suitable number.

The hierarchical encoding procedure employed by the encoder module 112 involves subdividing the original object shape (the shape defined by the boundary 302) until a sufficiently regular region is obtained or a maximum depth denoted by D:=[$\log_2 \overline{K}$] is reached.

With more specificity, prior to partitioning a shape, the encoder module 112 examines the current depth of the partitioning process. When the depth is beneath the threshold D, the solidity determiner module 114 computes a solidity for a shape (e.g., the shape illustrate in FIG. 3). The encoder module 112 determines whether the shape corresponds to a partition condition based upon the solidity for the shape (e.g., the encoder module 112 compares the solidity with the threshold $\tau$ (e.g., 0.9)). When the depth and the solidity are both below D and $\tau$, respectively, the partitioner module 116 divides the shape into multiple shapes. In the example set forth herein, the partitioner module 116 subdivides the shape defined by the boundary 302 into two shapes (sometimes referred to as partitions). It is to be understood, however, that the partitioner module 116 can be configured to subdivide a shape into any suitable number of shapes.

As there is often no prior knowledge as to how to partition the shape, the partitioner module 116 identifies a partition direction at each partition of a shape to form refined partitions. The above process is repeated until termination conditions are satisfied. In an example, the center identifier module 120 obtains the shape defined by the boundary 302 and computes a mass center of the shape. The direction determiner module 122 identifies a partition line that extends through such mass center. Specifically, viewing the boundary 302 as two-dimensional data, the direction determiner module 122 identifies a direction of minimum data variance (denoted as P), or equivalently, the second principal direction of the data matrix that represents the boundary 302. The identified partition line passes through the mass center $c_{\mathcal{M}}$ of $\mathcal{M}$. The resultant partitions can be denoted as $\mathcal{M}_1$ and $\mathcal{M}_2$.

Figure 5:
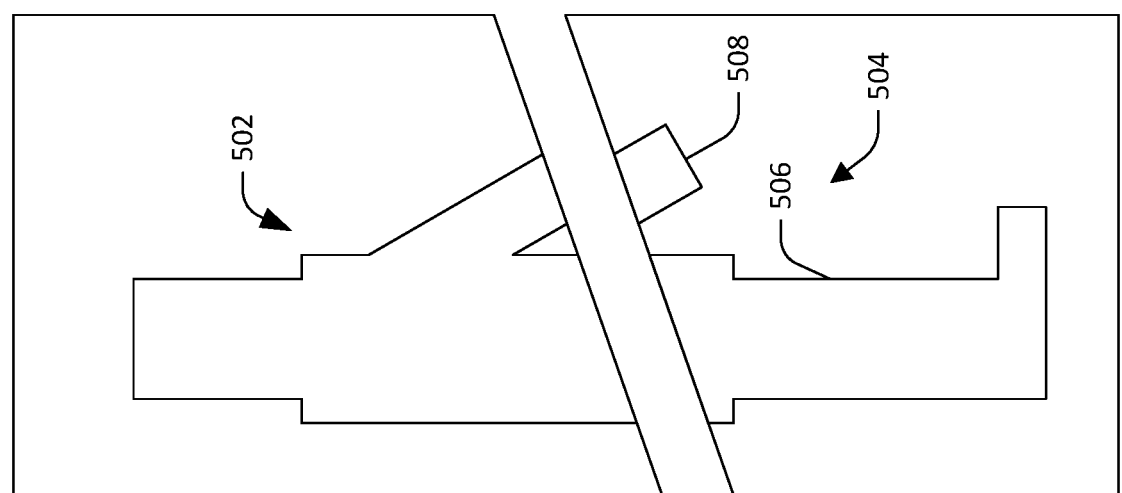
FIG. 5 illustrates the shape being partitioned through the partition line.
Figure 4:
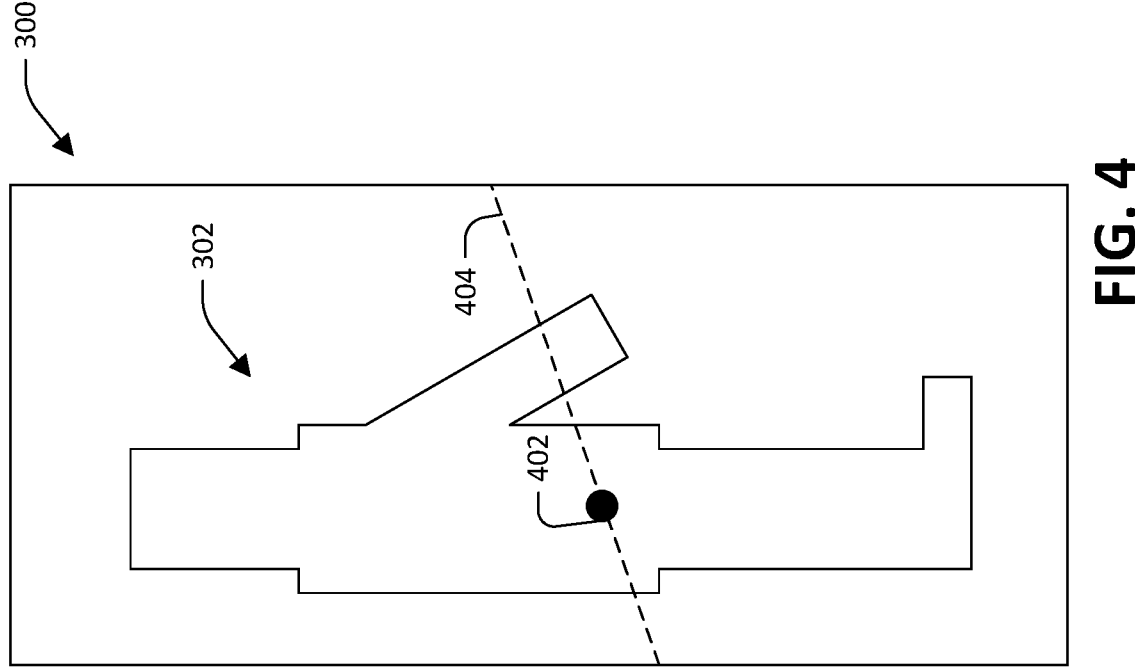
FIG. 4 illustrates a center mass of a shape defined by the boundary and a partition line that passes through the center mass.
Figure 7:
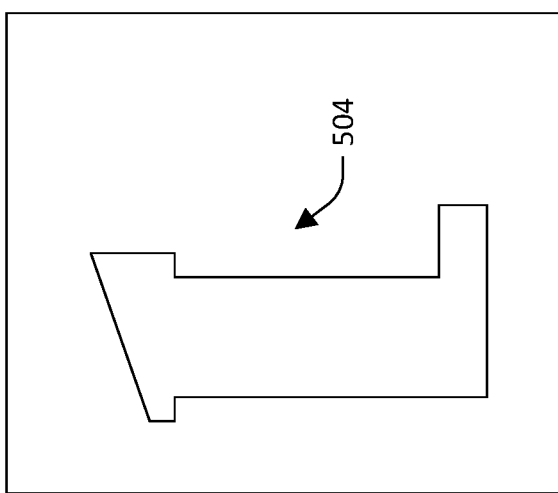
FIGS. 6 and 7 illustrate reorganizing disconnected components of partitions.
Figure 6:
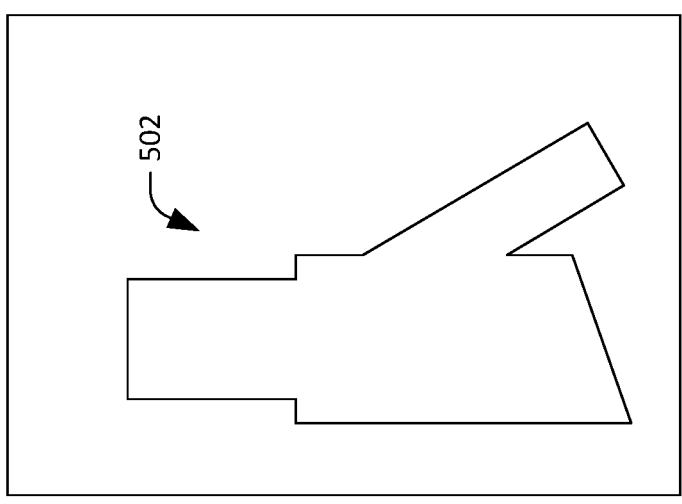

FIG. 4 depicts the image 300, where the image includes the boundary 302 and where a center mass 402 and a partition line 404 have been identified by the partitioner module 116. FIG. 5 depicts the shape defined by the boundary 302 partitioned into multiple different shapes 502 and 504. FIG. 5 illustrates an issue that can arise when a shape is partitioned in the manner described above. Specifically, a shape can include multiple disconnected components. As shown in FIG. 5, the second shape 504 includes components 506 and 508, which are disconnected from one another. Because the second shape 504 includes disconnected components, evaluating solidity of the second shape 504 does not make sense and identifying an angle-based contour descriptor that accurately describes boundaries of the two disconnected components becomes infeasible. To address this issue, the encoder module 112 can identify situations where a shape includes several disconnected components. When a shape includes several disconnected components, the partitioner module 116 can identify the component with the largest area in the shape (e.g., the first component 506), and can provide the remaining components (e.g., the second component 508) with smaller areas to the other shape (the first shape 502). It is noted that the partitioner module 112 does not introduce new disconnected components, but instead consolidates constituent parts, thereby preserving connectivity of shapes. FIGS. 6 and 7 illustrate the first shape 502 and the second shape 504 output by the partitioner module 116, where neither of the shapes 502 nor 504 includes disconnected components.

Once the two shapes 502 and 504 are output by the partitioner module 116, the above mentioned procedure is repeated for each of the newly created shapes 502 and 504, with an updated maximum hierarchical depth of D-1. The partitioner module 116 continues to partition the shapes into increasingly smaller shapes until a termination condition is met, where such termination condition is when the maximum depth is obtained or when the partition has a solidity that is above the predefined threshold $\tau$.

Figure 8:
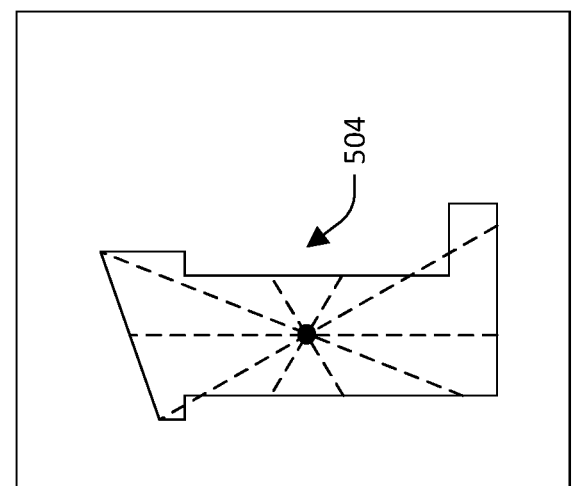
FIG. 8 illustrates a local angle-based contour descriptor for a shape partition.

The descriptor generator module 118, upon the partitioner module 116 partitioning the shape into numerous shapes, receives the shapes and computes an angle-based contour descriptor for each shape provided thereto by the partitioner module 116. To that end, for each shape in the shapes, the descriptor generator module 118 identifies a center of the shape, where the center is a mass center when the center falls within the shape; otherwise, the descriptor generator module 118 can identify the center of the shape as being a center of the largest inscribed circle in the shape. The descriptor generator module 118 computes radii values at predefined angles, which can be uniformly sampled (e.g., $r \in \mathbb{R}^{360}$). Referring to FIG. 8, a graphical view of a local angle-based contour descriptor 800 for the second shape 504 is presented. The angle-based contour descriptor includes a value that is indicative of a center of the second shape 504 and further includes a distance vector that includes distance values from the center 802 to the boundary of the second shape 504 at predefined angles relative to a reference direction. The encoder module 112 can then obtain a next image from the training set stored in the data store 106, and the process can repeat for numerous objects captured in the images 108-110.

Algorithm 1, set forth below, is an example algorithm that can be employed by the encoder module 112 to hierarchically partition shapes into multiple shapes and compute angle-based contour descriptors for the multiple shapes, such that the parent shape is encoded as several angle-based contour descriptors. The algorithm can be regarded as a greedy approach for solving Eq. 1. Although the algorithm is greedy, subregions become increasingly regular as the subdivision progresses. This is because the partitioner module 116 partitions shapes into smaller areas (shapes) using relatively simple lines, which serve as new boundaries for those smaller shapes, thus making the shapes more amenable to representation by angle-based contour descriptors. Experimentally it has been observed that even without prior geometric information regarding a relatively irregular shape, the partitioner module 116 causes partitions to automatically emerge around challenging areas of the irregular shapes.

---

Algorithm 1

1: Input: $\mathcal{M} \in \{0,1\}^{W \times H}$, $\tau \in (0,1)$, $D \in \mathbb{Z}^{\geq 0}$, where $\mathcal{M}$ is a binary mask, $\tau$ is the solidity threshold, and D is the maximum depth.
2: Output: Set of centers $\mathcal{C}$ and a set of distance vectors
3: Initialization: $\mathcal{C} = \{ \}$, $\mathcal{R} = \{ \}$.
4: function HIERARCHICAL-ENCODING ($\mathcal{M}$, $\tau$, D)
5:   Calculate the solidity of the shape in $\mathcal{M}$
6:   if D = 0 or Sld($\mathcal{M}$) > $\tau$, then
7:     Calculate the center c and distance vector r
8:     Update $\mathcal{C} = \mathcal{C} \cup \{c\}$ and $\mathcal{R} = \mathcal{R} \cup \{r\}$
9:   end if
10:   Calculate the mass center $c_{\mathcal{M}}$ of $\mathcal{M}$
11:   Find the direction P of the least data variance in $\mathcal{M}$
12:   Calculate $\mathcal{M}_1$, $\mathcal{M}_2$ = SPLIT ($\mathcal{M}$, $c_{\mathcal{M}}$, P)
13:   while $\mathcal{M}_1$ or $\mathcal{M}_2$ is not connected, do
14:     Update $\mathcal{M}_1$, $\mathcal{M}_2$ = REORG ($\mathcal{M}_1$, $\mathcal{M}_2$)
15:   end while
16:     HIERARCHICAL-ENCODING ($\mathcal{M}_1$, $\tau$, D − 1)
17:     HIERARCHICAL ENCODING ($\mathcal{M}_2$, $\tau$, D − 1)
18: end

---

It is understood that the above algorithm is but one example approach for encoding a shape obtained from an image through utilization of multiple angle-based contour descriptors.

The memory 104 further includes a subspace estimator module 124 and a subspace projection module 126. The subspace estimator module 124 generates an approximation of a contour descriptor output by the descriptor generator module 118. As indicated previously, a shape encoding output by the contour descriptor module 118 includes several angle-based contour descriptors, with each angle-based contour descriptor including a value that is indicative of a center of a shape represented by the contour descriptor and a distance vector that includes radii values at predefined angles from a reference direction. The subspace estimator module 124 estimates a relatively low-dimensional subspace for shape encodings of multiple shapes of objects in the images 108-110. With more particularity, interdependence of object shapes motivates utilization of low-rank subspace projection to effectively capture structural patterns. The number of objects in the training set can be denoted by L, and equation $\tilde{L}$ can denote the total number of angle-based contour descriptors after the encoder module 112 has encoded shapes of objects in the images 108 through 110 (where $\tilde{L} \geq L$). The subspace estimator module 124 constructs a contour matrix A=[$r_1$, $r_2$, . . . $r_L$] $\in \mathbb{R}^{N \times \tilde{L}}$ by concatenating (stacking) the distance vectors of the angle-based contour descriptors. The subspace estimator module 124, to identify a basis U* for the subspace $\mathcal{S}$ by solving the nonconvex problem of least absolute loss:

$$\min_{U \in \mathbb{O}(N,M)} \sum_{j=1}^{\tilde{L}} \left\| (I - UU^T) r_j \right\|_2 \tag{2}$$

where $\mathbb{O}(N, M) := \{U \in \mathbb{R}^{N \times M}: U^T U = I_M\}$ is the set of orthonormal matrices. The subspace estimator module 124 minimizes the sum of absolute deviations from all data points to their projections onto $\mathcal{S}$. Due to the geometric meaning of minimizing the least absolute deviations, the subspace estimator module 124 essentially estimates a "median" basis of the underlying M-dimensional subspace, as opposed to a "mean" basis, and therefore is more robust than conventional approaches.

The subspace projection module 126 can approximate the distance vectors through use of subspace projection. As U* is learned from A, which contains the distance vectors of the angle-based contours of shapes of multiple objects in the training set (the images 108-110), the subspace projection module 126 employs the universal basis U* for reconstructing the distance vectors of angle-based local contours over different objects.

Specifically, for the jth object, j=1, . . . , L, the matrix containing $K_j$ distance vectors is denoted by $$R^{(j)} = \left[ r_1^j, r_2^j, \ldots, r_{K_j}^j \right],$$

where the matrix containing $K_j$ is computed by the partitioner module 116 (e.g., through utilization of algorithm 1 referenced above)

$$\left( \sum_{j=1}^{L} K_j = \tilde{L} \right).$$

Accordingly, the subspace projection module 126 has the low dimensional projection of $R^{(j)}$ calculated as follows:

$$\hat{R}^{(j)} = U^* U^{*T} R^{(j)} = U^* \Omega^{(j)} \tag{3}$$

where $\Omega^{(j)} = U^{*T} R^{(j)} \in \mathbb{R}^{M \times K_j}$ is the coefficient matrix. Each N-dimensional distance vector can be approximated by an M-dimensional row vector of $\Omega^{(j)}$ that lies in $\mathcal{S}$. In practice, since $U^*$ is fixed after Eq. 2, the subspace projection module 126 can cause the coefficient matrix $\Omega^{(j)}$ to be stored to approximate the distance vectors. When combined with the centers, the subspace projection module 126 can efficiently and faithfully reconstruct the angle-based contour descriptors of objects. A boundary of an object can be obtained by using the outer edge of the union of the local angle-based contour descriptors for the object.

The technologies described herein are well-suited for various computer vision and computer graphics applications. More specifically, the technologies described herein are well-suited for shape retrieval and image segmentation. For example, a machine learning model can be trained to perform image segmentation, where training data includes images, the coefficient matrix that represents distance vectors of the local angle-based contours, and values of centers of the local angle-based contours. In other words, a machine learning model can be trained to receive an image and then output: 1) a coefficient matrix that is representative of distance vectors of local contour descriptors for objects in the image; and 2) center values of the local contour descriptors. The basis can be used together with the coefficient matrix and center values to reconstruct the local angle-based contour descriptors of objects in the image, and a boundary of an object can be retrieved through identification of the outer edge of the union of the local angle-based contour descriptors of the object.

Figure 10:
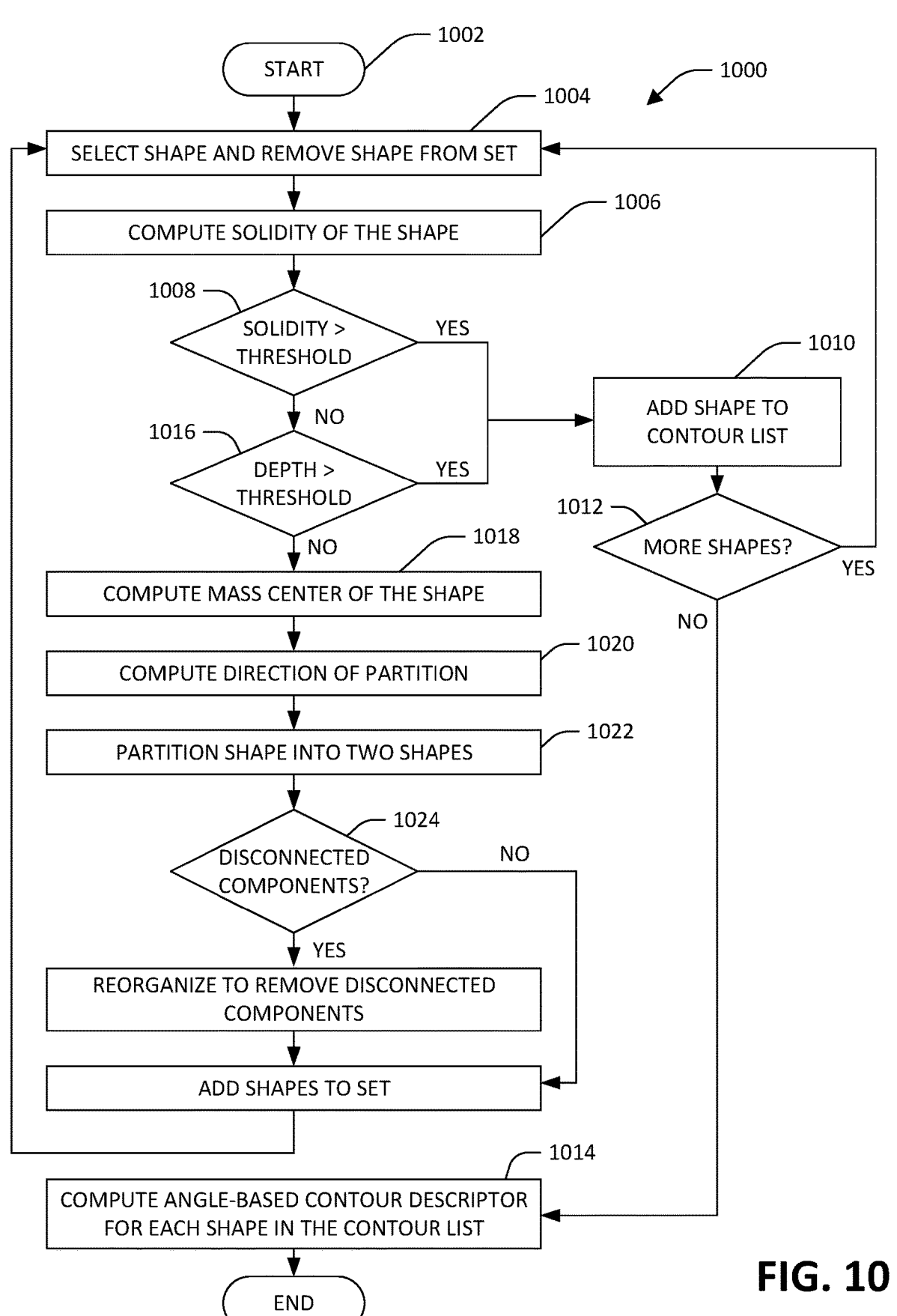
FIG. 10 is a flow diagram that represents a hierarchical approach for encoding a boundary of an object using multiple angle-based contour descriptors.
Figure 11:
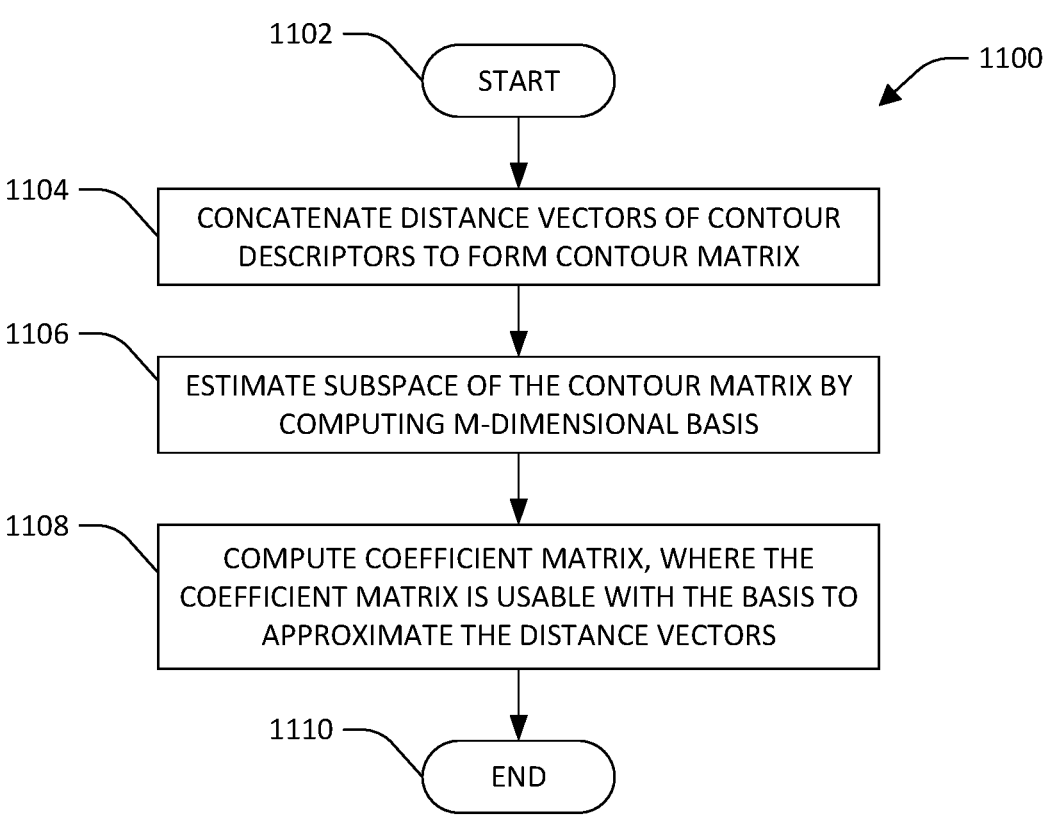
FIG. 11 is a flow diagram that illustrates a method for reconstructing a contour descriptor for an object.

FIGS. 9-11 illustrate methodologies relating to encoding a shape of an object in an image using multiple angle-based contour descriptors and/or approximating such contour descriptors. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now solely to FIG. 9, a flow diagram illustrating a method 900 for computing multiple angle-based contour descriptors in connection with encoding a shape of an object in an image is illustrated. The method 900 starts at 902, and at 904 an image is obtained, where the image includes an object that has a shape. A boundary of the shape of the object is labeled in the digital image.

At 906, in connection with encoding the shape of the object, the shape is partitioned into multiple partitions, where the multiple partitions include a first partition and a second partition. At 908, a first angle-based contour descriptor that represents a boundary of the first partition is computed. At 910, a second angle-based contour descriptor that represents a boundary of the second partition is computed. The encoding for the shape of the object is based upon the first angle-based contour descriptor and the second angle-based contour descriptor. The method 900 completes at 912.

Referring now to FIG. 10, a flow diagram illustrating an example method 1000 for encoding a shape of an object in an image is illustrated. The method 1000 starts at 1002, and at 1004 a shape is selected and removed from a set of shapes. When the shape is initially obtained from the image, the set includes the shape (and therefore after selection of the shape the set is empty). At 1006, a solidity of the shape is computed. At 1008, the solidity of the shape is compared with a threshold. When the solidity of the shape is above the threshold, the method proceeds to 1010, where the shape is added to a contour list. At 1012, a determination is made as to whether there are any additional shapes in the set. When there are additional shapes in the set, the method returns to 1004, where another shape is selected and removed from the set. When it is determined at 1012 that there are no further shapes in the set, the method proceeds to 1014, where an angle-based contour descriptor is computed for each shape in the contour list.

When it is determined that 1008 that the solidity of the shape is not above the threshold, the method proceeds to 1016, where a determination is made as to whether a depth assigned to the shape is above a threshold. As described previously, the depth of the shape is indicative of a number of parent shapes for the shape. When it is determined at 1016 that the depth assigned to shape is above the threshold, the method 1000 proceeds to 1010, where the shape is added to the contour list. new line when it is determined at 1016 that the depth is less than or equal to the threshold, then the shape is partitioned into multiple shapes. More specifically, at 1018 a mass center of the shape is computed. At 1020, a partition line is computed, where the partition line passes through the mass center of the shape. As described above, the partition line is orthogonal to the first principal direction of the shape. At 1022, the shape is partitioned into two shapes (a first shape and a second shape). At 1024, a determination is made as to whether either the first shape or the second shape has a disconnected component. When it is determined at 1024 that the either of the first shape or the second shape includes a disconnected component, then at 1026, the first shape and the second shape are reorganized to remove disconnected components. Specifically, when the first shape includes a first disconnected component and a second disconnected component (where the first disconnected component has a larger area than the second disconnected component), the second disconnected component is removed from the first shape and added to the second shape. Similarly, when the second shape includes a third disconnected component and a fourth disconnected component (where the third disconnected component has a larger area than the fourth disconnected component), the fourth disconnected component is removed from the second shape and added to the first shape.

When it is determined at 1024 that the first shape and the second shape do not have disconnected components or subsequent to act 1026 where the disconnected components are reorganized such that the first shape and the second shape do not include disconnected components, then at 1028 the first shape and the second shape are added to the set. The method then returns to 1004, where a shape is selected and removed from the set. Subsequent to the angle-based contour being computed for each shape in the contour list at 1014, the method 1000 completes at 1030.

Turning now to FIG. 11, a flow diagram illustrating a method 1100 for computing a coefficient matrix that represents angle-based contours descriptors is illustrated, where the coefficient matrix is usable to reconstruct angle-based contour descriptors for objects. The method 1100 starts at 1102, and at 1104 distance vectors of local angle-based contour descriptors that represent shapes of numerous objects are concatenated to form a contour matrix.

At 1106, a subspace of the contour matrix is estimated by computing an M dimensional basis. At 1108, a coefficient matrix is computed, where the coefficient matrix is usable with the basis to approximate the distance vectors. The method 1100 completes at 1110.

Referring now to FIG. 12, a high-level illustration of an exemplary computing device 1200 that can be used in accordance with the systems and methodologies disclosed herein is illustrated. For instance, the computing device 1200 may be used in a system that encodes shapes of objects in images. By way of another example, the computing device 1200 can be used in a system that approximates angle-based contour descriptors. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store images, shape encodings, a basis, a coefficient matrix, etc.

The computing device 1200 additionally includes a data store 1208 that is accessible by the processor 1202 by way of the system bus 1206. The data store 1208 may include executable instructions, images, a basis, a coefficient matrix, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various aspects pertaining to encoding shapes have been described herein in accordance with at least the following examples.

(A1) In an aspect, a computer-implemented method includes obtaining an image that includes an object having a shape, where a boundary of the shape of the object in the digital image is labeled in the digital image. The method also includes generating an encoding for the shape of the object. Generating the encoding for the shape of the object includes: 1) partitioning the shape into multiple shapes, where the multiple shapes include a first shape and a second shape; 2) computing a first angle-based contour descriptor that represents a boundary of the first shape; and 3) computing a second angle-based contour descriptor that represents a boundary of the second shape, where the encoding for the shape of the object is based upon the first angle-based contour descriptor and the second angle-based contour descriptor.

(A2) In some embodiments of the method of (A1), the method further includes computing a value of solidity for the shape. The method additionally includes determining that the value of solidity of the shape meets a partition condition, where the shape is partitioned into multiple shapes based upon the value of solidity of the shape meeting the partition condition.

(A3) In some embodiments of the method of (A2), the value of solidity of the shape is indicative of regularity of the shape.

(A4) In some embodiments of the method of at least one of (A1)-(A3), partitioning the shape into multiple partitions includes: 1) identifying a mass center of the shape; and 2) computing a line of partition, where the line of partition passes through the mass center of the shape, where the shape is partitioned into the first shape and the second shape along the line of partition such that the first shape and the second shape are bounded by the line of partition.

(A5) In some embodiments of the method of (A4), the first shape includes a first component and a second component that are disconnected in the first shape. The method also includes determining that a first area of the first component is larger than a second area of the second component. The method further includes, based upon determining that the first area of the first component is larger than the second area of the second component, removing the second component from the first shape and adding the second component to the second shape.

(A6) In some embodiments of the method of at least one of (A1)-(A5), the method further includes, subsequent to the first shape being formed, determining that a partition depth assigned to the first shape corresponds to a depth condition, the partition depth being indicative of a number of parent shapes of the first shape, where the first angle-based contour descriptor is computed subsequent to determining that the partition depth corresponds to the depth condition.

(A7) In some embodiments of the method of at least one of (A1)-(A6), the method also includes, subsequent to the first shape being formed, computing a value of solidity of the first shape. The method additionally includes determining that the first shape is sufficiently regular based upon the value of solidity of the first shape, where the first angle-based contour descriptor is computed subsequent to determining that the first shape is sufficiently regular.

(A8) In some embodiments of the method of at least one of (A1)-(A7), the first angle-based contour descriptor comprises a first value for a center of the first shape and a first distance vector that includes first distance values corresponding to angles from the center of the first shape, and the second angle-based contour comprises a second value for a center of the second shape and a second distance vector that includes second distance values corresponding to the angles from the center of the second shape.

(A9) In some embodiments of the method of (A8), the method also includes creating a contour matrix that includes distance vectors for several shapes corresponding to numerous objects in images, where the contour matrix includes the first distance vector and the second distance vector. The method additionally includes estimating a subspace for the contour matrix based upon the distance vectors. The method further includes computing an M-dimensional basis for the subspace, where an estimate of the encoding for the shape of the object is recoverable based upon the basis for the subspace.

(A10) In some embodiments of the method of (A9), the method also includes computing a coefficient matrix for the object, where the coefficient matrix includes several M-dimensional row vectors, where the first distance vector is recoverable based upon the basis for the subspace and a first row vector in the M-dimensional row vectors, and further where the second distance vector is recoverable based upon the basis for the subspace and a second row vector in the M-dimensional row vectors.

(A11) In some embodiments of the method of (A10), the method additionally includes training a neural network based upon the coefficient matrix for the object, the center of the first shape, the center of the second shape, the first distance vector, and the second distance vector, where the neural network, when trained, is configured to compute a second coefficient matrix for a second object in a second image provided as input to the neural network.

(B1) In another aspect, a method performed by a processor of a computing system includes obtaining an image that includes an object having a shape, where a boundary of the shape of the object in the digital image is labeled in the digital image. The method also includes computing an encoding for the shape. Computing the encoding for the shape includes: 1) partitioning the shape into multiple partitions; and 2) for the multiple partitions, computing angle-based contour descriptors that represent boundaries of the partitions, where the encoding for the shape of the object is based upon the angle-based contour descriptors.

(B2) In some embodiments of the method of (B1), the method also includes computing a value of solidity for the shape. The method additionally includes determining that the value of solidity of the shape corresponds to a partition condition, where the shape is partitioned into the multiple partitions based upon the value of solidity of the shape corresponding to the partition condition.

(B3) In some embodiments of the method of (B2), the value of solidity of the shape is indicative of regularity of the shape.

(B4) In some embodiments of the method of at least one of (B1)-(B3), partitioning the shape into multiple partitions includes: 1) identifying a mass center of the shape; and 2) computing a line of partition, where the line of partition passes through the mass center of the shape, where the shape is partitioned into a first partition and a second partition along the line of partition such that the first partition and the second partition are bounded by the line of partition.

(B5) In some embodiments of the method of (B4), the first partition includes a first component and a second component that are separated in the first partition. The method also includes determining that a first area of the first component is larger than a second area of the second component. The method also includes based upon determining that the first area of the first component is larger than the second area of the second component, removing the second component from the first partition and adding the second component to the second partition.

(B6) In some embodiments of the method of at least one of (B1)-(B5), the method further including, subsequent to a partition in the multiple partitions being formed, determining that a partition depth assigned to the partition corresponds to a depth condition, the partition depth being indicative of a number of parent partitions of the partition, where an angle-based contour descriptor for the partition is computed subsequent to determining that the partition depth corresponds to the depth condition.

(B7) In some embodiments of the method of at least one of (B1)-(B6), the method also includes, subsequent to a partition in the multiple partitions being formed, computing a value of solidity of the partition. The method also includes determining that the partition is not to be further partitioned based upon the value of solidity of the partition, where an angle-based contour descriptor is computed subsequent to determining that the partition is not to be further partitioned.

(B8) In some embodiments of the method of at least one of (B1)-(B7), each angle-based contour descriptor comprises a value for a center of a partition and a distance vector that includes distance values corresponding to angles from the center of the partition.

(C1) In another aspect, a computing system includes a processor and memory, where the memory includes instructions that, when executed by the processor, cause the processor to perform at least one of the methods described herein (e.g., any of the methods of (A1)-(A11) or (B1)-(B8)).

(D1) In yet another aspect, a computer-readable storage medium includes instructions that, when executed by a processor, cause the processor to perform at least one of the methods described herein (e.g., any of the methods of (A1)-(A11) or (B1)-(B8)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
obtaining a digital image that includes an object having a shape, where a boundary of the shape of the object in the digital image is labeled in the digital image; and
generating an encoding for the shape of the object, where generating the encoding for the shape of the object comprises:
computing a value of solidity for the shape;
determining that the value of solidity of the shape meets a partition condition;
partitioning the shape into multiple shapes based upon the value of the solidity of the shape meeting the partition condition, where the multiple shapes include a first shape and a second shape;
computing a first angle-based contour descriptor that represents a boundary of the first shape; and
computing a second angle-based contour descriptor that represents a boundary of the second shape, where the encoding for the shape of the object is based upon the first angle-based contour descriptor and the second angle-based contour descriptor.

2. The computing system of claim 1, where the value of solidity of the shape is indicative of regularity of the shape.

3. The computing system of claim 1, where partitioning the shape into multiple shapes comprises:

identifying a mass center of the shape; and
computing a line of partition, where the line of partition passes through the mass center of the shape, where the shape is partitioned into the first shape and the second shape along the line of partition such that the first shape and the second shape are bounded by the line of partition.

4. The computing system of claim 3, where the first shape includes a first component and a second component that are disconnected in the first shape, the acts further comprising:
determining that a first area of the first component is larger than a second area of the second component; and
based upon determining that the first area of the first component is larger than the second area of the second component, removing the second component from the first shape and adding the second component to the second shape.

5. The computing system of claim 1, the acts further comprising:
subsequent to the first shape being formed, determining that a partition depth assigned to the first shape corresponds to a depth condition, the partition depth being indicative of a number of parent shapes of the first shape, where the first angle-based contour descriptor is computed subsequent to determining that the partition depth corresponds to the depth condition.

6. The computing system of claim 1, the acts further comprising:
subsequent to the first shape being formed, computing a value of solidity of the first shape; and
determining that the first shape is sufficiently regular based upon the value of solidity of the first shape, where the first angle-based contour descriptor is computed subsequent to determining that the first shape is sufficiently regular.

7. The computing system of claim 1, where the first angle-based contour descriptor comprises a first value for a center of the first shape and a first distance vector that includes first distance values corresponding to angles from the center of the first shape, and the second angle-based contour comprises a second value for a center of the second shape and a second distance vector that includes second distance values corresponding to the angles from the center of the second shape.

8. The computing system of claim 7, the acts further comprising: creating a contour matrix that includes distance vectors for several shapes corresponding to numerous objects in digital images, where the contour matrix includes the first distance vector and the second distance vector; estimating a subspace for the contour matrix based upon the distance vectors; and computing an M-dimensional basis for the subspace, where an estimate of the encoding for the shape of the object is recoverable based upon the basis for the subspace.

9. The computing system of claim 8, the acts further comprising:
computing a coefficient matrix for the object, where the coefficient matrix includes several M-dimensional row vectors, where the first distance vector is recoverable based upon the basis for the subspace and a first row vector in the M-dimensional row vectors, and further where the second distance vector is recoverable based upon the basis for the subspace and a second row vector in the M-dimensional row vectors.

10. The computing system of claim 9, the acts further comprising: training a neural network based upon the coefficient matrix for the object, the center of the first shape, the center of the second shape, the first distance vector, and the second distance vector, where the neural network, when trained, is configured to compute a second coefficient matrix for a second object in a second digital image provided as input to the neural network.

11. A method performed by a processor of a computing system, the method comprising:

obtaining a digital image that includes an object having a shape, where a boundary of the shape of the object in the digital image is labeled in the digital image; and computing an encoding for the shape, where computing the encoding for the shape comprises:

computing a value of solidity for the shape;

determining that the value of solidity of the shape corresponds to a partition condition;

partitioning the shape into multiple partitions based upon the value of solidity of the shape corresponding to the partition condition; and for the multiple partitions, computing angle-based contour descriptors that represent boundaries of the partitions, where the encoding for the shape of the object is based upon the angle-based contour descriptors.

12. The method of claim 11, where the value of solidity of the shape is indicative of regularity of the shape.

13. The method of claim 11, where partitioning the shape into multiple partitions comprises:

identifying a mass center of the shape; and computing a line of partition, where the line of partition passes through the mass center of the shape, where the shape is partitioned into a first partition and a second partition along the line of partition such that the first partition and the second partition are bounded by the line of partition.

14. The method of claim 13, where the first partition includes a first component and a second component that are separated in the first partition, the method further comprising: determining that a first area of the first component is larger than a second area of the second component; and based upon determining that the first area of the first component is larger than the second area of the second component, removing the second component from the first partition and adding the second component to the second partition.

15. The method of claim 11, further comprising:

subsequent to a partition in the multiple partitions being formed, determining that a partition depth assigned to the partition corresponds to a depth condition, the partition depth being indicative of a number of parent partitions of the partition, where an angle-based contour descriptor for the partition is computed subsequent to determining that the partition depth corresponds to the depth condition.

16. The method of claim 11, further comprising:

subsequent to a partition in the multiple partitions being formed, computing a value of solidity of the partition; and determining that the partition is not to be further partitioned based upon the value of solidity of the partition, where an angle-based contour descriptor is computed subsequent to determining that the partition is not to be further partitioned.

17. The method of claim 11, where each angle-based contour descriptor comprises a value for a center of a partition and a distance vector that includes distance values corresponding to angles from the center of the partition.

18. A non-transitory computer-readable storage medium comprising instructions that, when executed by a processor, cause the processor to perform acts comprising:

obtaining a digital image that includes an object having a shape, where a boundary of the shape of the object in the digital image is labeled in the digital image; and generating an encoding for the shape of the object, where generating the encoding for the shape of the object comprises:

computing a value of solidity for the shape;

determining that the value of solidity of the shape corresponds to a partition condition;

partitioning the shape into multiple partitions, based upon the value of solidity of the shape corresponding to the partition condition, where the multiple partitions include a first partition and a second partition;

computing a first angle-based contour descriptor that represents a boundary of the first partition; and computing a second angle-based contour descriptor that represents a boundary of the second partition, where the encoding for the shape of the object is based upon the first angle-based contour descriptor and the second angle-based contour descriptor.

* * * * *